(12) United States Patent
Dusold

(10) Patent No.: US 11,498,625 B1
(45) Date of Patent: Nov. 15, 2022

(54) TRUCK BED STORAGE SHELF

(71) Applicant: Andrew W. Dusold, Shoreview, MN (US)

(72) Inventor: Andrew W. Dusold, Shoreview, MN (US)

( * ) Notice: Subject to any disclaimer, the term of this patent is extended or adjusted under 35 U.S.C. 154(b) by 158 days.

(21) Appl. No.: 17/171,771

(22) Filed: Feb. 9, 2021

(51) Int. Cl.
*B62D 33/02* (2006.01)

(52) U.S. Cl.
CPC .................. *B62D 33/0207* (2013.01)

(58) Field of Classification Search
CPC ....... B62D 33/0207; B60R 9/00; B60R 9/045; B60R 11/06; B60R 2011/004; B60R 7/02; B60J 7/141; B60J 7/1621
See application file for complete search history.

(56) References Cited

U.S. PATENT DOCUMENTS

| | | | | |
|---|---|---|---|---|
| 3,514,152 A * | 5/1970 | Vance | ................. | B60J 7/141 296/100.07 |
| 5,782,522 A * | 7/1998 | DeBono | ................. | B60J 7/1621 296/100.18 |
| 5,927,783 A * | 7/1999 | Baka | ................. | B60J 7/102 296/37.6 |
| 6,135,527 A * | 10/2000 | Bily | ................. | B60R 7/02 410/121 |
| 6,217,103 B1 * | 4/2001 | Schultz | ................. | B60J 7/1621 296/100.09 |
| 6,241,137 B1 * | 6/2001 | Corr | ................. | B60R 9/00 224/539 |
| 6,641,013 B2 * | 11/2003 | Dise | ................. | B60R 9/00 83/928 |
| 7,131,684 B1 * | 11/2006 | Gooding | ................. | B60J 7/141 296/100.1 |
| 8,376,446 B2 * | 2/2013 | Golden | ................. | B60J 7/141 296/100.03 |
| 2015/0283949 A1 * | 10/2015 | V | ................. | B60R 5/045 296/24.44 |

* cited by examiner

*Primary Examiner* — Corey N Skurdal
(74) *Attorney, Agent, or Firm* — Johnson and Phung LLC; Thomas N. Phung

(57) ABSTRACT

A one-piece pick-up truck bed storage shelf including a foldable body having a dimension of an interior perimeter of a truck bed, a top surface and a wheel well engaging bottom surface with the foldable body including a first and a second support panel each having a first and second end, a first side edge of the first support panel having a shape corresponding to a contour of a first elongated sidewall of the interior truck bed and a first side edge of the second support panel having a shape corresponding to a contour of a second elongated sidewall of an interior truck bed and a hinge pivotably connecting the second side edges of the first and second support panel while allowing for the movement of the support panels from a linear condition to a mirroring condition.

20 Claims, 6 Drawing Sheets

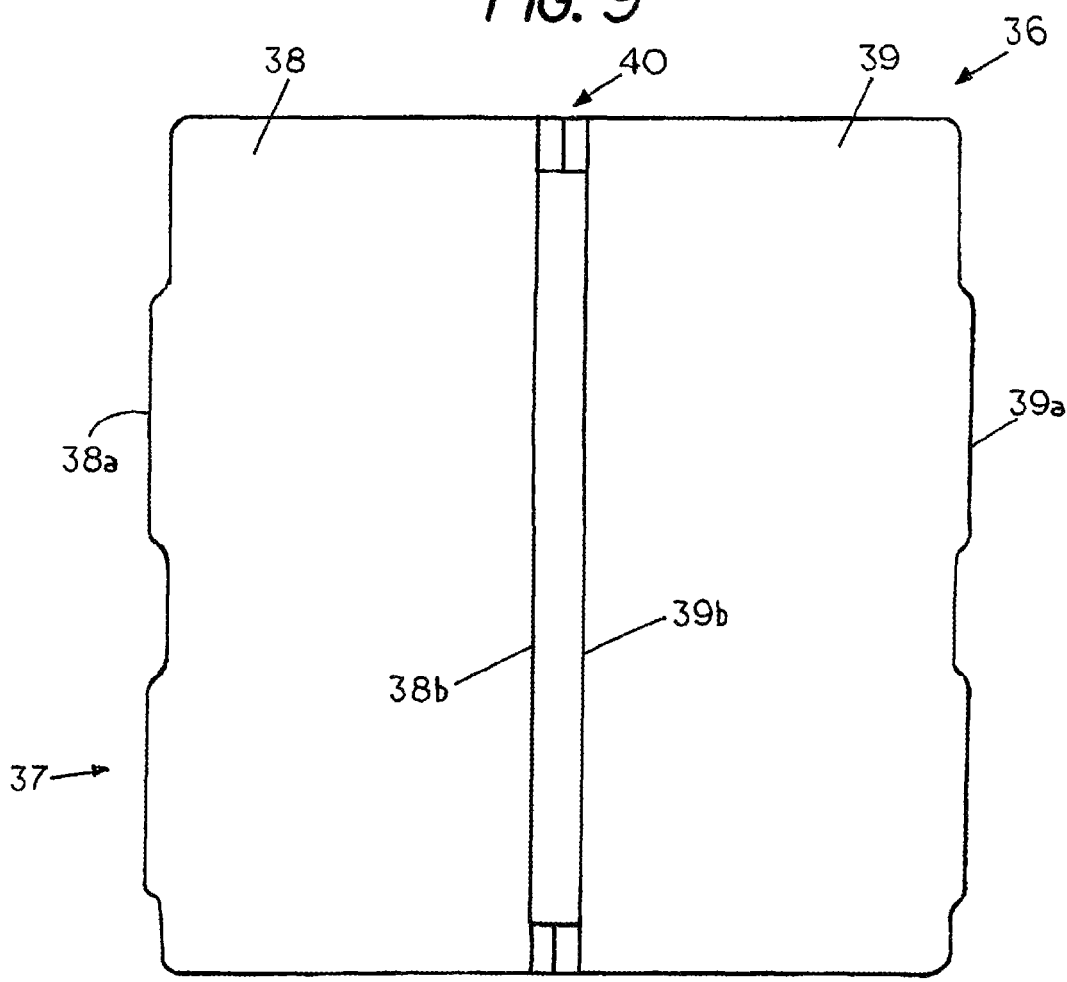

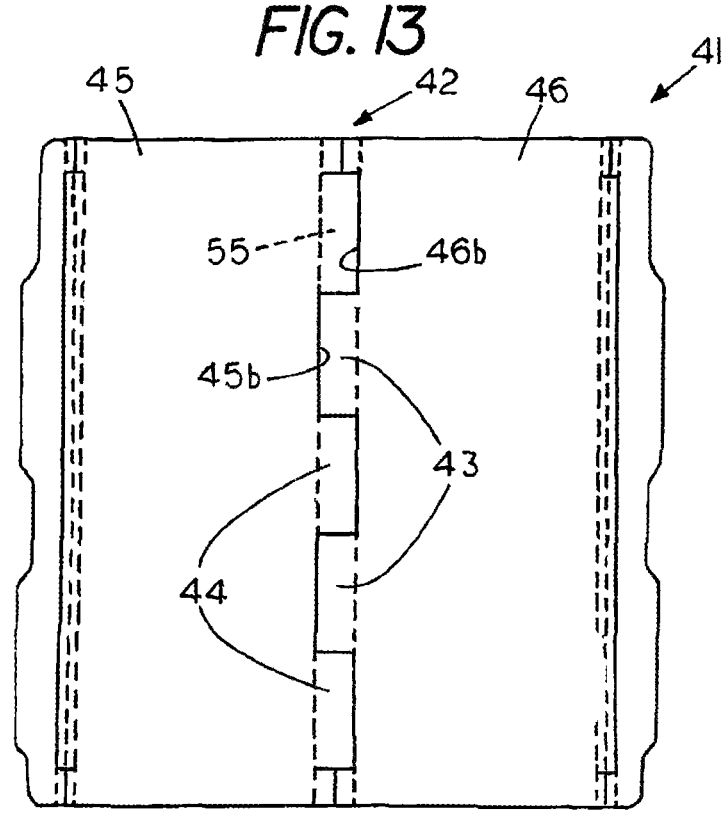
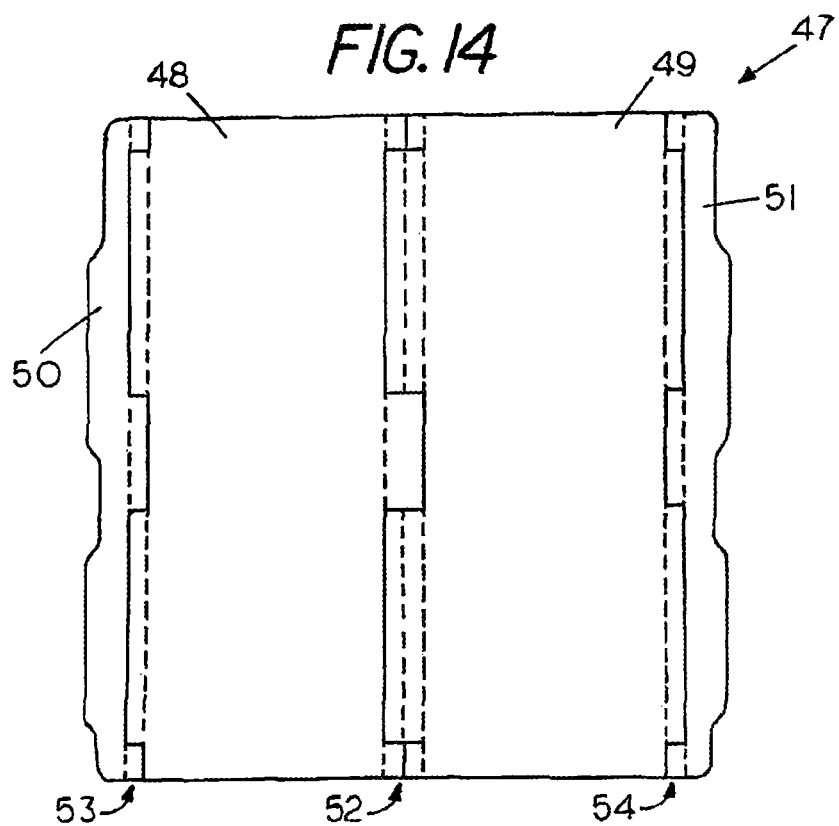

TRUCK BED STORAGE SHELF

FIELD OF THE INVENTION

This invention relates generally to pick-up truck beds and, more specifically to an adjustable storage shelving for the beds of pick-up trucks.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Storage containers and storage systems for pick-up truck beds are known in the art and generally include permanently fixed structures that are directly secured to a portion of the pick-up truck bed. As an option to fixed storage containers, pickup truck owners have been known to also use storage totes or plastic containers for supporting cargos on their pick-up truck bed.

Due to the growing sizes and depths of newer models of pick-up trucks, it is often difficult to directly access items such as tools or groceries located within the pick-up truck beds without having to drop down the tailgate and enter the truck bed.

The truck bed storage shelf of the present invention solves the aforementioned issues by providing for a storage shelf designed to fit into any truck bed above the wheel wells to increase the usable storage space of the truck bed by dividing the pick-up truck bed into the top storage section and bottom storage section. In addition, the side edges of the truck bed storage shelf are measured to fit to the contours of the interior side walls of the truck bed reduce or prevent displacement of the storage shelf with respect to the truck bed.

SUMMARY OF THE INVENTION

Briefly, the present invention comprises a one-piece pick-up truck bed storage shelf that includes a foldable truck bed shelf body having a dimension of a width and length of an interior perimeter of a pick-up truck bed, an article supporting top surface and a bottom surface engaging a portion of a truck bed wheel well to divide the pick-up truck bed into a top storage section and a bottom storage section.

The foldable truck bed shelf body includes a first main support panel and a second main support panel each having a first side edge and a second side edge. Located on the bottom surface of the foldable truck bed shelf body proximal and running parallel to a first end of the foldable truck bed shelf body is a first recess and located on the bottom surfaces of the foldable truck bed shelf body proximal and running parallel to a second end of the foldable truck bed shelf body is a second recess with the first recess engaging a first crossmember supported between the interior sidewalls of the pick-up truck bed and the second recesses engaging a second crossmember supported between the interior sidewalls of the pick-up truck bed to assist the truck bed wheel wells to divide the pick-up truck bed into the top storage section and the bottom storage section.

The one-piece pick-up truck bed storage shelf also includes a first hinge pivotably connecting the second side edge of the first main support panel with the second side edge of the second main support panel with the first hinge allowing for movement of the support panels from a linear condition to a mirroring condition with respect to each other to enable the panels to fold against each other.

The one-piece pick-up truck bed storage shelf further includes a first side panel having a first side edge and a second side edge with the first side edge having a shape corresponding to a contour of a first elongated side of an interior pick-up truck bed and a second side panel having a first side edge and a second side edge with the first side edge having a shape corresponding to a contour of a second elongated side of an interior pick-up truck bed. Connecting the first side edge of the first main support panel with the second side edge of the first side panel is a second hinge pivotably and connecting the first side edge of the second main support panel with the second side edge of the second side panel a third hinge pivotably.

BRIEF DESCRIPTION OF THE DRAWINGS

FIG. 9 is a top view showing an alternative embodiment of a one-piece adjustable pick-up truck bed storage shelf;

FIG. 10 shows an end view of the one-piece adjustable pick-up truck bed storage shelf of FIG. 9;

FIG. 11 shows an end view of the one-piece adjustable pick-up truck bed storage shelf of FIG. 9 with a hinge panel located at a 90 degrees angle with respect to the support panels;

FIG. 12 shows an end view of the one-piece adjustable pick-up truck bed storage shelf of FIG. 9 with all of the panels folded in a contracted storage condition;

FIG. 13 is a top view showing an alternative embodiment of a one-piece adjustable pick-up truck bed storage shelf having a hinge form from a first and second set of knuckles;

FIG. 14 is a top view showing an alternative embodiment of a one-piece adjustable pick-up truck bed storage shelf having all of the hinges form from sets of knuckles;

DESCRIPTION OF THE PREFERRED EMBODIMENT

Figure 1:
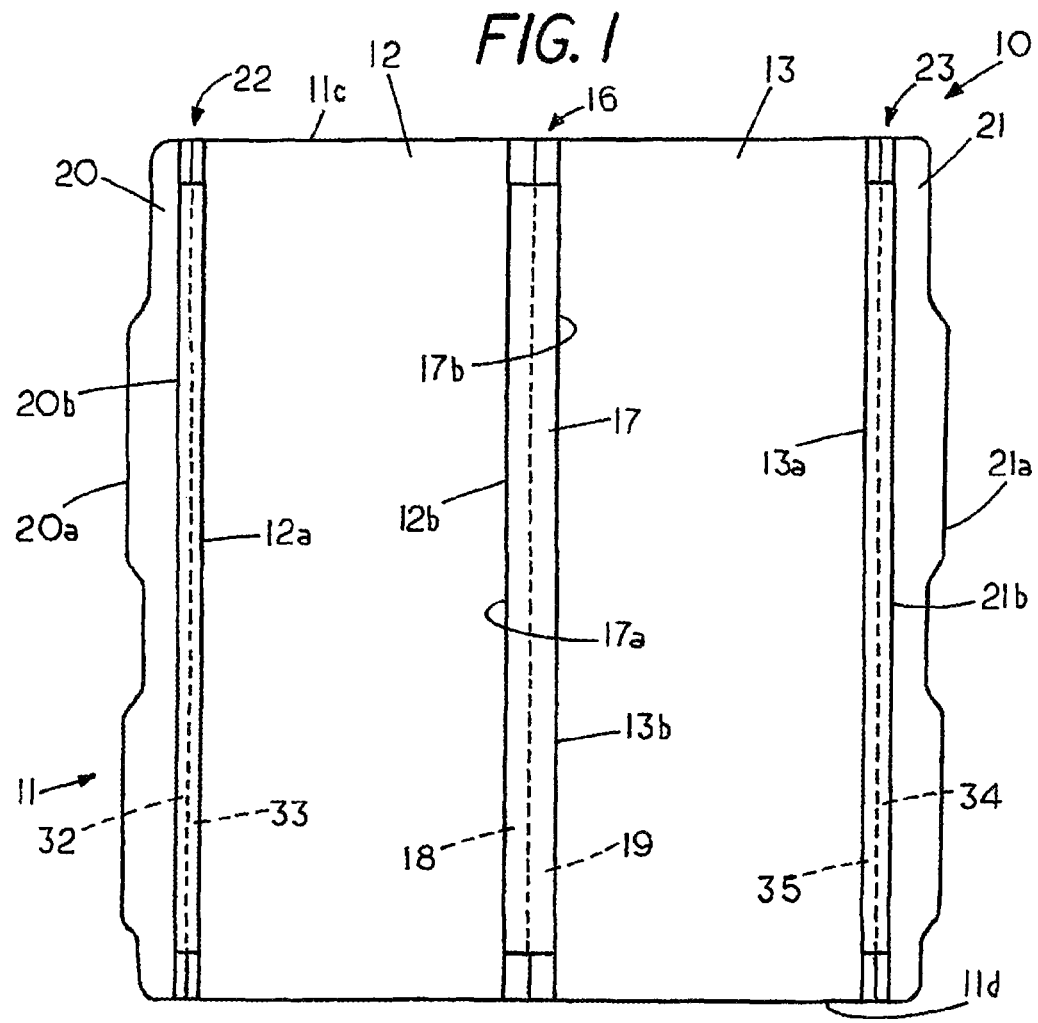
FIG. 1 is a top view showing an embodiment of a one-piece adjustable pick-up truck bed storage shelf.
Figure 2:
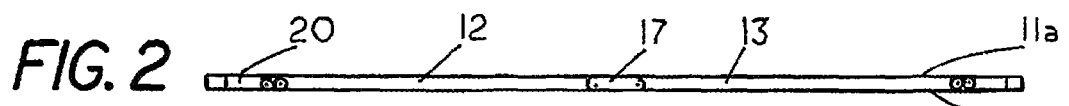
FIG. 2 shows an end view of the one-piece adjustable pick-up truck bed storage shelf of FIG. 1.
Figure 3:
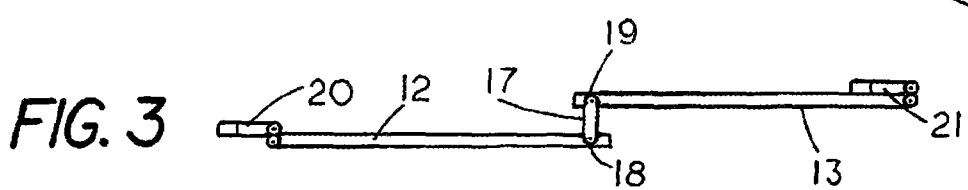
FIG. 3 shows an end view of the one-piece adjustable pick-up truck bed storage shelf of FIG. 1 with one of the side panel folded against one of the support panels.
Figure 4:
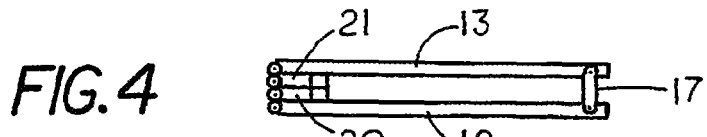
FIG. 4 shows an end view of the one-piece adjustable pick-up truck bed storage shelf of FIG. 1 with all of the panels folded in a contracted storage condition.
Figure 5:
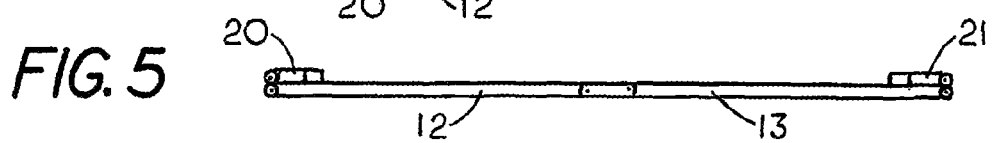
FIG. 5 shows an end view of the one-piece adjustable pick-up truck bed storage shelf of FIG. 1 with both of the side panels folded against the corresponding support panels.

The general purpose of the present invention, which will be described subsequently in greater detail, is to provide an adjustable storage shelving to horizontally divide the storage capability of the beds of pick-up trucks. In one embodiment of the of the present invention the adjustable storage shelving of the present invention conforms to the sidewall topography of the bed of traditional pick-up trucks in a manner to assist in maintaining the adjustable storage shelving secured to the truck bed but also to provide for a cosmetically appealing fit.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Referring generally to the drawings, the present invention is directed to an adjustable pick-up truck bed storage shelf having a cross-section that conforms to the sidewall topography of a bed of traditional pick-up trucks in a manner to assist in maintaining the adjustable pick-up truck bed storage shelf in a stationary condition to the truck bed while dividing the pick-up truck bed into a top storage section and a bottom storage section with the bottom section having sufficient clearance to allow for the storage of various work items including but not limited to tool boxes, storage containers, electric and non-electric tools.

Referring to FIGS. 1-8, FIG. 1 is a top view showing an embodiment of a one-piece adjustable pick-up truck bed storage shelf 10 of the present invention which includes a foldable truck bed shelf body 11 having a dimension of a width and length of an interior perimeter of a pick-up truck bed. Although the pick-up truck bed storage shelf 10 may be made from molded plastic, which has the advantages of being light weight and weather resistant, the foldable truck bed shelf body 10 alternatively may be made from other materials including but not limited to various types of polymer plastics, fiberglass, wood, rubber, aluminum, steel, or the combination thereof.

Figure 6:
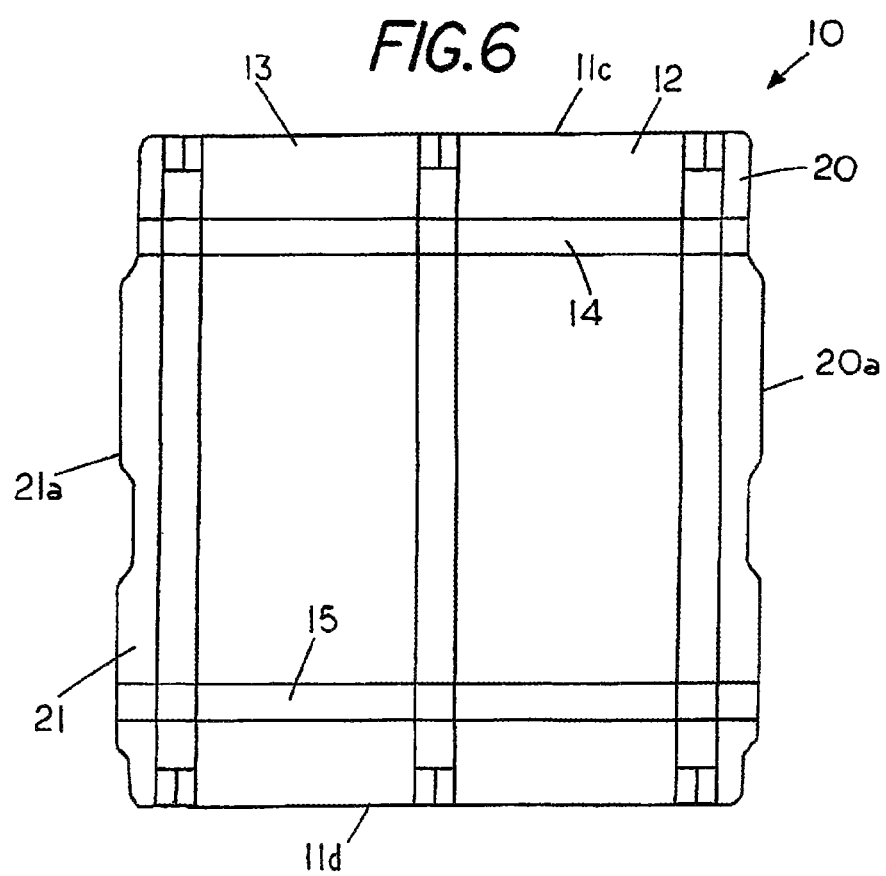
FIG. 6 shows a bottom view of the one-piece adjustable pick-up truck bed storage shelf of FIG. 1.
Figure 7:
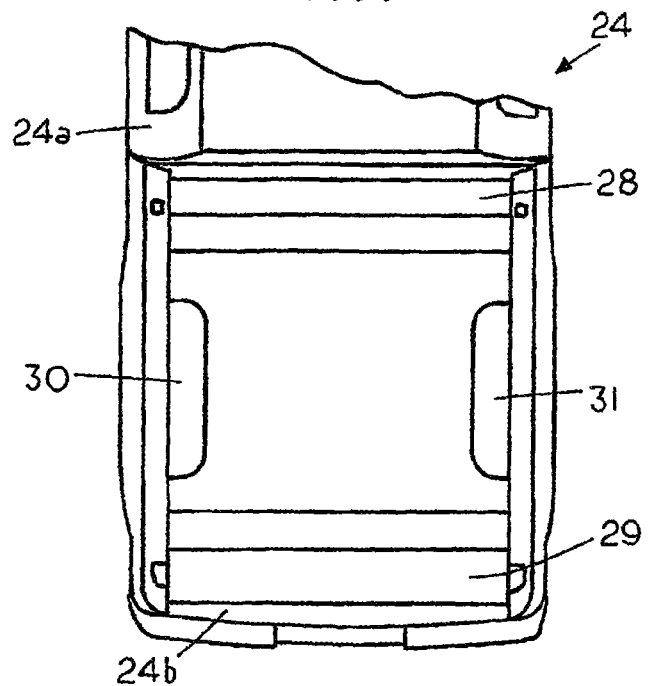
FIG. 7 shows a top view of a bed of a pick-up truck.
Figure 8:
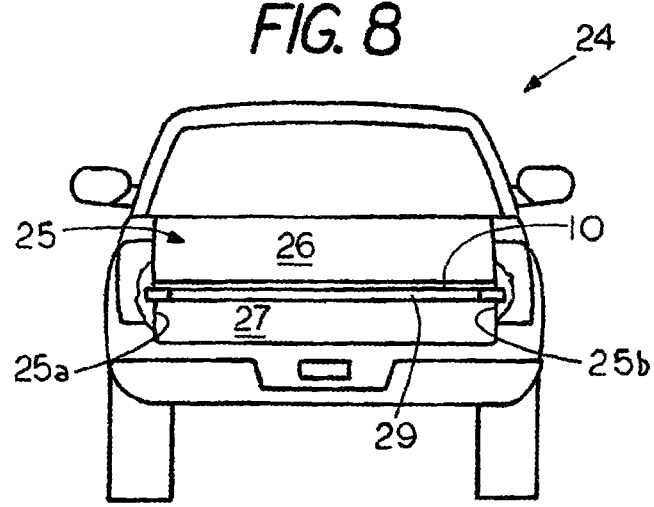
FIG. 8 shows a rear view of the pick-up truck of FIG. supporting the one-piece adjustable pick-up truck bed storage shelf within the bed of the pick-up truck.

FIGS. 2-5 are end views of the one-piece adjustable pick-up truck bed storage shelf 10 of FIG. 1 showing the folding adjustability of the foldable truck bed shelf body 11 in various positions to allow for easy removal and storability of the pick-up truck bed storage shelf 10. FIG. 6 is a bottom view of the one-piece adjustable pick-up truck bed storage shelf 10 of FIG. 1. FIG. 7 is a top view of a bed 25 of a pick-up truck 24. FIG. 8 is a rear view of the pick-up truck 24 of FIG. 7 showing the one-piece adjustable pick-up truck bed storage shelf 10 of FIG. 1 supported in a stationary condition within the truck bed 25 while dividing the pick-up truck bed 25 into a top storage section 26 and a bottom storage section 27.

Foldable truck bed shelf body 11 generally includes an article supporting top surface 11a and a bottom surface 11b engaging a portion of the truck bed wheel wells 30, 31 to divide the pick-up truck bed 25 into the top storage section 26 and bottom storage section 27. The foldable truck bed shelf body 11 also includes a first main support panel 12 and a second main support panel 13 each having a first side edge 12a, 13a and a second side edge 12b, 13b.

The foldable truck bed shelf body 11 also includes a first hinge 16 pivotally connecting the first main support panel 12 with the second main support panel 13 to allow for the movement of the support panels 12, 13 from a linear condition to a mirroring condition with respect to each other to enable the panels to fold against each other. Although the hinge may comprise a various type of hinges, in the embodiment of FIGS. 1-6 the first hinge comprises a hinge panel 17 having a first side 17a and a second side 17b with the first side 17a of the hinge panel 17 pivotable connected to the second side 12b of the first main support panel 12 by a first linking rod 18 and the second side 17b of the hinge panel 17 pivotable connected to the second side 13b of the second main support panel 13 by a second linking rod 19.

The foldable truck bed shelf body 11 further includes a first side panel 20 and a second side panel 21 with first side panel 20 having a first side edge 20a and a second side edge 20b with the first side edge 20a having a shape corresponding to a contour of a first elongated side of the interior pick-up truck bed 25 and with second side panel 21 having a first side edge 21a and a second side edge 13b with the first side edge 21a having a shape corresponding to a contour of a second elongated side of the interior pick-up truck bed 25, which provides the feature of reducing or preventing displacement of the foldable truck bed shelf body 11 with respect to pick-up truck bed 25. Pivotably connecting the first side edge 12a of the first main support panel 12 with the second side edge 20b of the first side panel 20 is a second hinge pivotably 22 and pivotably connecting the first side edge 13a of the second main support panel 13 with the second side edge 21b of the second side panel 21 is a third hinge 23.

Although in alternative embodiments of the present invention the first hinge 16, the second hinge 22 and the third hinge 23 may comprise the same type of hinge, in the embodiment of FIGS. 1-6, the second hinge 22 and the third hinge 23 each comprises a pair of linking rods 32, 33 connecting the first main support panel 12 with the first side panel 20 and a pair of linking rods 34 and 25 connecting the second main support panel 13 with the second side panel 21.

In general regards to the pivotal hinges of the present invention, it is noted that the hinges may each provide for the same or varying degrees of motion including but not limited to at least 180 degrees range of motion, 270 degrees range of motion, and 360 degrees range of motion to allow for the movement of adjacent panels of the truck bed storage shelf from a linear condition to a mirroring condition with respect to each other a mirroring condition to enable the panels to fold against each other.

Located on the bottom surface 11b of the foldable truck bed shelf body 11 proximal and running parallel to a first end 11c of the foldable truck bed shelf body 11 is a first cross member supporting recess 14 and located on the bottom surface 11b of the foldable truck bed shelf body 11 proximal and running parallel to a second end 11d of the foldable truck bed shelf body 11 a second cross member supporting recess 15. The first cross member supporting recess 14 functions to engage a first crossmember 28, shown in FIG. 7, supported between the interior sidewalls 25a, 25b of a pick-up truck bed 25 and the second cross member supporting recesses 15 functions to engage a second crossmember 29 supported between the interior sidewalls 25a, 25b of the pick-up truck bed to assist the truck bed wheel wells 30, 31 to support the foldable truck bed shelf body 11 within the truck bed 25 while dividing the pick-up truck bed 25 into the top storage section 26 and the bottom storage section 27.

Referring to FIGS. 9-12, FIG. 9 is a top view showing an alternative embodiment of a one-piece adjustable pick-up truck bed storage shelf 36 of the present invention having similar general components to the one-piece adjustable pick-up truck bed storage shelf 10 of FIGS. 1-6. FIGS. 10-12 are end views of the one-piece adjustable pick-up truck bed storage shelf 36 of FIG. 9 showing the folding adjustability of the foldable truck bed shelf body 36 in various positions similar to FIGS. 1-6.

More specifically, similar to truck bed storage shelf 10, the one-piece adjustable pick-up truck bed storage shelf 36 includes a foldable truck bed shelf body 37 having a dimension of a width and length of an interior perimeter of a pick-up truck bed. Foldable truck bed shelf body 37 generally includes an article supporting top surface 37a and a bottom surface 37b engaging a portion of the truck bed wheel wells 30, 31 to divide the pick-up truck bed 37 into the top storage section and bottom storage section.

However, unlike the truck bed storage shelf 10, the foldable truck bed shelf body 37 includes a first main support panel 38 and a second main support panel 39 each having a first side edge 38a, 38a and a second side edge 39b, 39 with the first side edge 38a having a shape corresponding to a contour of a first elongated side of the interior pick-up truck bed 25 and the first side edge 39a having a shape corresponding to a contour of a second elongated side of the interior pick-up truck bed 25.

Pivotally connecting the second side edge 38b of the first main support panel 38 with the second side edge 39b of the second main support panel 39 is a hinge 40 which allows for the movement of the support panels 38, 39 from a linear condition to a mirroring condition with respect to each other to enable the panels to fold against each other.

FIG. 13 is a top view showing an alternative embodiment of a one-piece adjustable pick-up truck bed storage shelf 41 of the present invention having similar general components to the one-piece adjustable pick-up truck bed storage shelf 10 of FIGS. 1-6. However, unlike pick-up truck bed storage shelf 10, pick-up truck bed storage shelf 41 includes a first hinge 42 comprising a first set of knuckles 43 with an axial continuous passage located on a second side 45b of a first support panel 45 and second set of knuckles 44 with an axial continuous passage located on a second side 46b of a second support panel 46. The second set of knuckles 44 extends between and axially aligns with the first set of knuckles 43 and their connection is maintained by at least one hinge linking rod 55 extending through the first set knuckles 43 and the second set of knuckles 44 to pivotally connect the first support panel 45 with the second support panel 46 to allow for the movement of the support panels 45, 46 from a linear condition to a mirroring condition with respect to each other to enable the panels to fold against each other.

FIG. 14 is a top view showing an alternative embodiment of a one-piece adjustable pick-up truck bed storage shelf 47 of the present invention having similar general components to the one-piece adjustable pick-up truck bed storage shelf 10 of FIGS. 1-6. However, unlike pick-up truck bed storage shelf 10, a first support panel 48, a second support panel 49, a first side panel 50, and a second side panel 51 are attached to their adjacent panels by a first knuckle-based pivotal hinge 52, a second knuckle-based pivotal hinge 53, and a third knuckle-based pivotal hinge 54 with their connection being maintained by at least one hinge linking rod extending through the corresponding knuckles to provide for a pivotal connection to allow for the movement of the panels 48, 49, 50, 51 from a linear condition to a mirroring condition with respect to each other to enable the panels to fold against each other.

Figure 15:
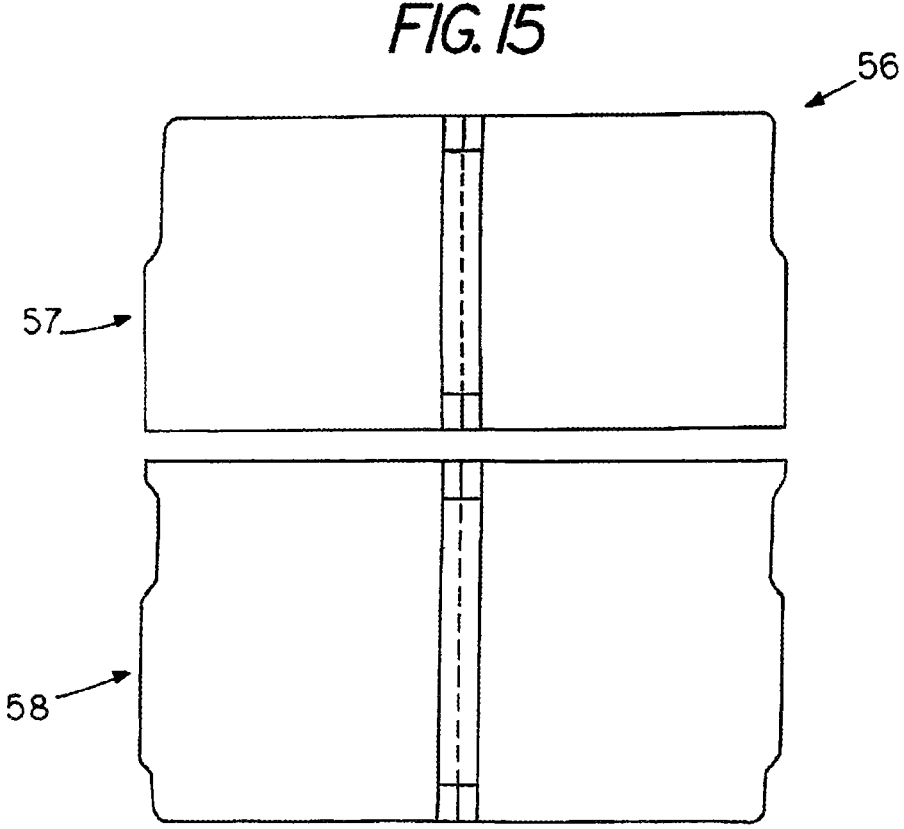
FIG. 15 is a top view showing an alternative embodiment of an adjustable pick-up truck bed storage shelf having two separate shelf bodies.

FIG. 15 is a top view showing an alternative embodiment of an adjustable pick-up truck bed storage shelf 56 of the present invention having similar general components to the adjustable pick-up truck bed storage shelf 36 of FIGS. 9-12. However, unlike pick-up truck bed storage shelf 36, pick-up truck bed storage shelf 56 includes a first shelf body 57 extending from proximal a truck cabin 24a to a portion of the wheel wells 30, 31 and a separate second shelf body 58 extending from a portion of the wheel wells 30, 31 to proximal a truck tailgate 24b (see FIG. 7). Separating the adjustable pick-up truck bed storage shelf 56 into 2 portions provides for the adjustability feature of enabling the user to either divide the entire pick-up truck bed into a top storage section and a bottom storage section or only a portion of the pick-up truck bed into a top storage section and a bottom storage section while leaving the remaining portion of the pick-up truck bed un-bifurcated to support potentially larger cargos thereon.

Figure 16:
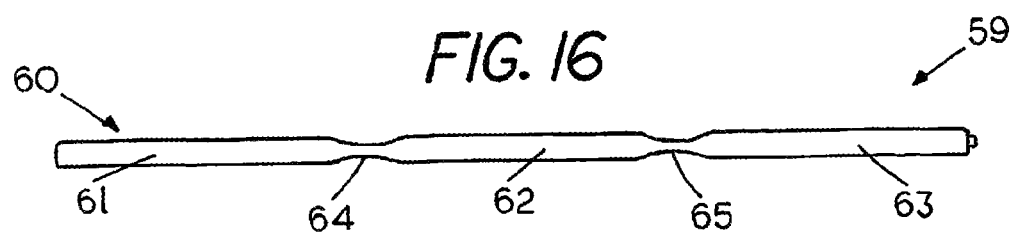
FIG. 16 is an end view showing an alternative embodiment of a one-piece adjustable pick-up truck bed storage shelf having support panels connected by living hinges.

FIG. 16 is an end view showing an alternative embodiment of a one-piece adjustable pick-up truck bed storage shelf 59 of the present invention that includes a foldable truck bed shelf body 60 having a first support panel 61, a second support panel 62, and a third support panel 63 with the second support panel 62 attached to the first and third support panels 61 and 62 by a first and second living hinges 64 and 65. The support panels 61, 62, 63 and living hinges 64, 65 preferably are integrally formed from the same material but alternatively may be made from different materials and are attached together into a one piece unit by a variety of means including by not limited to the use of adhesives, heat bonding, and various types of mechanical fasteners.

I claim:

1. A one-piece adjustable pick-up truck bed storage shelf comprising:
 a foldable truck bed shelf body having a dimension of a width and length of an interior perimeter of a pick-up truck bed, an article supporting top surface and a bottom surface engaging a portion of a truck bed wheel well to divide the pick-up truck bed into a top storage section and a bottom storage section, the foldable truck bed shelf body including a first support panel and a second support panel each having a first end, a second end, a first side edge and a second side edge, the first side edge of the first support panel having a shape corresponding to a contour of a first elongated sidewall of the interior pick-up truck bed and the first side edge of the second support panel having a shape corresponding to a contour of a second elongated sidewall of an interior pick-up truck bed; and
 a hinge pivotably connecting the second side edge of the first support panel with the second side edge of the second support panel while allowing for the movement of the support panels from a linear condition to a mirroring condition with respect to each other to enable the panels to fold against each other.

2. The one-piece adjustable pick-up truck bed storage shelf of claim 1 including a first support member engaging surface located on the bottom surface of the foldable truck bed shelf body proximal the first end of the foldable truck bed shelf body and a second support member engaging surface located on the bottom surface of the foldable truck bed shelf body proximal the second end of the foldable truck bed shelf body, the first support member engaging surface engaging a first crossmember supported between the interior sidewalls of the pick-up truck bed and the second support member engaging surface engaging a second crossmember supported between the interior sidewalls of the pick-up truck bed to assist the truck bed wheel wells to divide the pick-up truck bed into the top storage section and the bottom storage section.

3. The one-piece adjustable pick-up truck bed storage shelf of claim 1 including a first recess located on the bottom surface of the foldable truck bed shelf body proximal and running parallel to the first end of the foldable truck bed shelf body and a second recess located on the bottom surface of the foldable truck bed shelf body proximal and running parallel to the second end of the foldable truck bed shelf body, the first recess engaging a first crossmember supported between the interior sidewalls of the pick-up truck bed and the second recesses engaging a second crossmember supported between the interior sidewalls of the pick-up truck bed to assist the truck bed wheel wells to divide the pick-up truck bed into the top storage section and the bottom storage section.

4. The one-piece adjustable pick-up truck bed storage shelf of claim 1 wherein the first support panel comprises a first main support panel, a first side panel, and a hinge pivotably connecting the first main support panel to the first side panel and the second support panel comprises a second main support panel, a second side panel, and a hinge pivotably connecting the second main support panel to the second side panel.

5. The one-piece adjustable pick-up truck bed storage shelf of claim 4 wherein each of the hinges provide for 360 degrees range of motion.

6. The one-piece adjustable pick-up truck bed storage shelf of claim 1 wherein the hinge comprises a hinge housing supporting a pair of linking rods therein.

7. The one-piece adjustable pick-up truck bed storage shelf of claim 1 wherein the foldable truck bed shelf body and the hinge are made from the same material.

8. The one-piece adjustable pick-up truck bed storage shelf of claim 1 wherein the hinge comprises one or more first knuckles with an axial continuous passage located on the second side edge of the second support panel and one or more second knuckles with an axial continuous passage located on the second side edge of the first support panel, the one or more second knuckles extending between and axially aligned with the one or more first knuckles and a hinge rod extending through the one or more first knuckles and the one or more second knuckles to pivotally connect the first support panel with the second support panel.

9. The one-piece adjustable pick-up truck bed storage shelf of claim 1 wherein the hinge comprises a hinge panel having a first side and a second side, the first side of the hinge panel pivotably connected to the second side edge of the first support panel by a first linking rod and the second side of the hinge panel pivotably connected to the second side edge of the second support panel by a second linking rod.

10. The one-piece adjustable pick-up truck bed storage shelf of claim 1 wherein the hinge comprises a living hinge.

11. The one-piece adjustable pick-up truck bed storage shelf of claim 1 wherein the foldable truck bed shelf body is made from molded plastic, fiberglass, wood, aluminum, or steel.

12. The one-piece adjustable pick-up truck bed storage shelf of claim 1 wherein the hinge comprises one or more first knuckles each having a first protruding end and a second recess end located on the second side edge of the first support panel and one or more second knuckles each having a first protruding end and a second recess end located on the second side edge of the second support panel, the one or more second knuckles extending between and axially aligned with the one or more first knuckles with the protruding end of the one or more second knuckles rotatably secured to the one or more recess end of the first knuckles to pivotally connect the first support panel with the second support panel.

13. A one-piece adjustable pick-up truck bed storage shelf comprising:
 a foldable truck bed shelf body having a dimension of a width and length of an interior perimeter of a pick-up truck bed, an article supporting top surface and a bottom surface engaging a portion of a truck bed wheel well to divide the pick-up truck bed into a top storage section and a bottom storage section, the foldable truck bed shelf body including a first main support panel and a second main support panel each having a first side edge and a second side edge;
 a first cross member supporting recess located on the bottom surface of the foldable truck bed shelf body proximal and running parallel to a first end of the foldable truck bed shelf body and a second cross member supporting recess located on the bottom surface of the foldable truck bed shelf body proximal and running parallel to a second end of the foldable truck bed shelf body, the first cross member supporting recess engaging a first crossmember supported between the interior sidewalls of the pick-up truck bed and the second cross member supporting recesses engaging a second crossmember supported between the interior sidewalls of the pick-up truck bed to assist the truck bed wheel wells to support the foldable truck bed shelf body within the truck bed while dividing the pick-up truck bed into the top storage section and the bottom storage section;

a first hinge pivotably connecting the second side edge of the first main support panel with the second side edge of the second main support panel, the hinge allowing for the movement of the support panels from a linear condition to a mirroring condition with respect to each other to enable the panels to fold against each other;

a first side panel having a first side edge and a second side edge with the first side edge having a shape corresponding to a contour of a first elongated side of an interior pick-up truck bed;

a second side panel having a first side edge and a second side edge with the first side edge having a shape corresponding to a contour of a second elongated side of an interior pick-up truck bed;

a second hinge pivotably connecting the first side edge of the first main support panel with the second side edge of the first side panel; and a third hinge pivotably connecting the first side edge of the second main support panel with the second side edge of the second side panel.

14. The one-piece adjustable pick-up truck bed storage shelf of claim 13 wherein the foldable truck bed shelf body is made from molded plastic.

15. The one-piece adjustable pick-up truck bed storage shelf of claim 14 wherein the hinge pivotably connecting the first main support panel with the second main support panel comprises a hinge panel having a first side and a second side, the first side of the hinge panel pivotably connected to the second side edge of the first support panel by a first linking rod and the second side of the hinge panel pivotably connected to the second side edge of the second support panel by a second linking rod.

16. The one-piece adjustable pick-up truck bed storage shelf of claim 14 wherein the hinge pivotably connecting the first main support panel with the second main support panel comprises one or more first knuckles with an axial continuous passage located on the second side edge of the first main support panel and one or more second knuckles with an axial continuous passage located on the second side edge of the second main support panel, the one or more second knuckles extending between and axially aligned with the one or more first knuckles and a hinge rod extending through the one or more first knuckles and the one or more second knuckles to pivotably connect the first main support panel with the second main support panel.

17. The one-piece adjustable pick-up truck bed storage shelf of claim 14 wherein the first hinge, the second hinge and the third hinge comprise the same type of hinges.

18. An adjustable pick-up truck bed storage shelf comprising:

a foldable truck bed shelf body formed from at least two support panels, the foldable truck bed shelf body having a dimension of a width and length of an interior perimeter of a pick-up truck bed, the foldable truck bed shelf body including an article supporting top surface, a bottom surface engaging at least a portion of each of the truck bed wheel wells to divide the pick-up truck bed into a top storage section and a bottom storage section, a first side edge having a shape corresponding to a contour of a first elongated sidewall of the interior pick-up truck bed and a second side edge having a shape corresponding to a contour of a second elongated sidewall of an interior pick-up truck bed;

at least one hinge pivotably connecting the at least two panels of the foldable truck bed shelf body to each other while allowing for the movement of the support panels to fold against each other; and a first crossmember engaging recess located on the bottom surface of the foldable truck bed shelf body proximal and running parallel to a first end of the foldable truck bed shelf body and a second crossmember engaging recess located on the bottom surface of the foldable truck bed shelf body proximal and running parallel to a second end of the foldable truck bed shelf body, the first crossmember engaging recess supporting at least a portion of a first crossmember supported between the interior sidewalls of the pick-up truck bed proximal a truck cabin and the second crossmember engaging recess supporting at least a portion of a second crossmember supported between the interior sidewalls of the pick-up truck bed proximal a truck tailgate to assist the truck bed wheel wells to support the foldable truck bed shelf body in an elevated condition from a bottom surface of the pick-up truck bed.

19. The adjustable pick-up truck bed storage shelf of claim 18 wherein the foldable truck bed shelf body includes a first support panel, a second support panel, and a third support panel, a first hinge pivotably connecting the first support panel to the second support panel and a second hinge pivotably connecting the second panel to the third panel.

20. The adjustable pick-up truck bed storage shelf of claim 18 wherein the foldable truck bed shelf body comprises a first portion extending from proximal the truck cabin to a portion of the wheel wells and a separate second portion extending from a portion of the wheel wells to proximal the truck tailgate.

* * * * *